(12) United States Patent
Molta

(10) Patent No.: US 11,292,565 B2
(45) Date of Patent: Apr. 5, 2022

(54) LAMINATE

(71) Applicants: PierCarlo Molta, Prato (IT); Enrico Grassi, Montemurlo (IT)

(72) Inventor: PierCarlo Molta, Prato (IT)

(*) Notice: Subject to any disclaimer, the term of this patent is extended or adjusted under 35 U.S.C. 154(b) by 988 days.

(21) Appl. No.: 14/905,553

(22) PCT Filed: Jul. 18, 2014

(86) PCT No.: PCT/IB2014/063218
§ 371 (c)(1),
(2) Date: Jan. 15, 2016

(87) PCT Pub. No.: WO2015/008259
PCT Pub. Date: Apr. 22, 2015

(65) Prior Publication Data
US 2016/0152310 A1    Jun. 2, 2016

(30) Foreign Application Priority Data
Jul. 19, 2013    (IT) .......................... RA2013A000020

(51) Int. Cl.
*B63H 9/067* (2020.01)
*B32B 27/08* (2006.01)
(Continued)

(52) U.S. Cl.
CPC ............. *B63H 9/067* (2020.02); *B32B 5/022* (2013.01); *B32B 5/024* (2013.01); *B32B 5/028* (2013.01);
(Continued)

(58) Field of Classification Search
CPC .......... B63H 9/06; B63H 9/067; B32B 5/022; B32B 5/024; B32B 5/028; B32B 5/06; B32B 27/08; B32B 27/12; B32B 27/306; B32B 27/32; B32B 27/40; B32B 37/06; B32B 38/004; B32B 38/2262;
(Continued)

(56) References Cited

U.S. PATENT DOCUMENTS

| 4,838,192 A | * | 6/1989 | Stevenson, IV | ..... B63H 9/1092 114/105 |
| 5,038,700 A | * | 8/1991 | Conrad | ................ B63H 9/0657 114/102.24 |

(Continued)

FOREIGN PATENT DOCUMENTS

DE    20011626    5/2001
WO    2008/142725    11/2008

OTHER PUBLICATIONS

Physical Properties of Plastics (Obtained May 2, 2018).*
(Continued)

*Primary Examiner* — Sathavaram I Reddy
(74) *Attorney, Agent, or Firm* — Abelman, Frayne & Schwab; Stefan Knirr

(57) ABSTRACT

A laminate (1) delimited by at least a protective skin (30) and provided internally with reinforcing means (10) comprising a plurality of traction members (12, 20) arranged according to lines (L) traced in a given manner; at least one plastic matrix (M) shaped so as to stably embody each traction member (12, 20) to maintain it, under load, stably arranged point to point just as the corresponding line (L).

2 Claims, 3 Drawing Sheets

(51) Int. Cl.
*B32B 27/12* (2006.01)
*B32B 27/30* (2006.01)
*B32B 27/32* (2006.01)
*B32B 5/02* (2006.01)
*B32B 27/40* (2006.01)
*B32B 5/06* (2006.01)
*B32B 37/06* (2006.01)
*B32B 38/00* (2006.01)

(52) U.S. Cl.
CPC ............ *B32B 5/06* (2013.01); *B32B 27/08* (2013.01); *B32B 27/12* (2013.01); *B32B 27/306* (2013.01); *B32B 27/32* (2013.01); *B32B 27/40* (2013.01); *B32B 37/06* (2013.01); *B32B 38/004* (2013.01); *B32B 2262/0253* (2013.01); *B32B 2307/51* (2013.01); *B32B 2307/704* (2013.01); *B32B 2307/73* (2013.01); *B32B 2323/00* (2013.01); *B32B 2331/04* (2013.01); *B32B 2605/12* (2013.01)

(58) Field of Classification Search
CPC ............ B32B 38/0253; B32B 2307/51; B32B 2307/704; B32B 2307/73; B32B 2323/00; B32B 2331/04; B32B 2605/12
See application file for complete search history.

(56) References Cited

U.S. PATENT DOCUMENTS

| 5,097,784 A | 3/1992 | Baudet | |
| 2002/0193023 A1* | 12/2002 | Adriaensen | B29C 70/26 442/52 |
| 2003/0091785 A1* | 5/2003 | Howland | B32B 5/26 428/107 |
| 2008/0302290 A1* | 12/2008 | Molta | B29C 70/82 114/102.31 |

OTHER PUBLICATIONS

Tedlar Sample Bags by SKC (Year: 2015).*
International Search Report dated Nov. 7, 2014 for corresponding PCT patent application No. PCT/IB2014/063218.

* cited by examiner

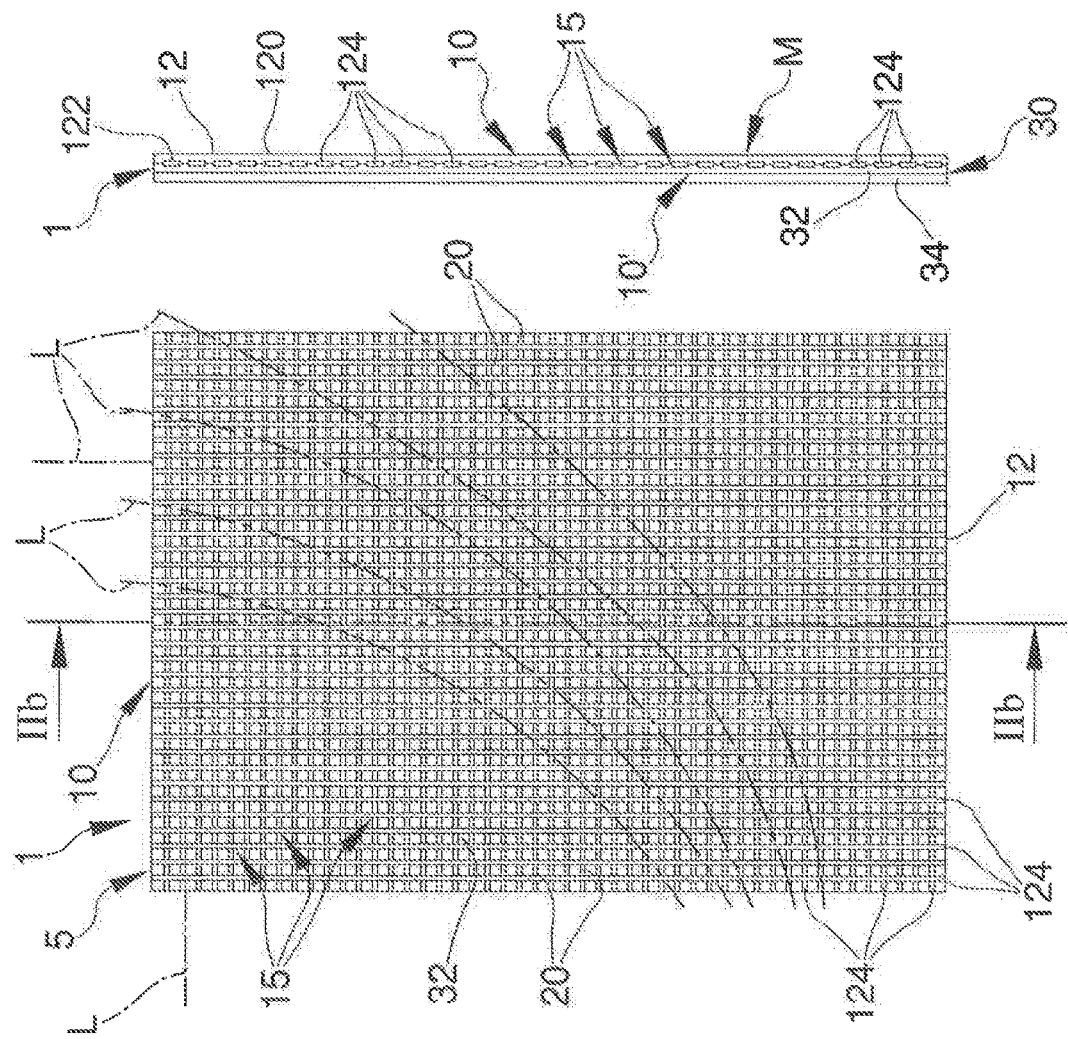
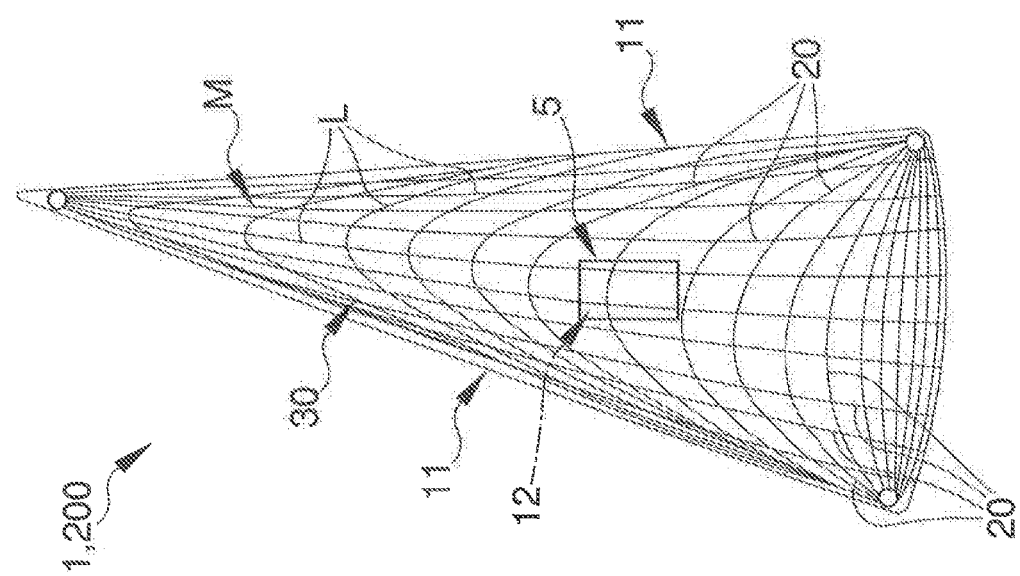
Fig. 2
Fig. 1

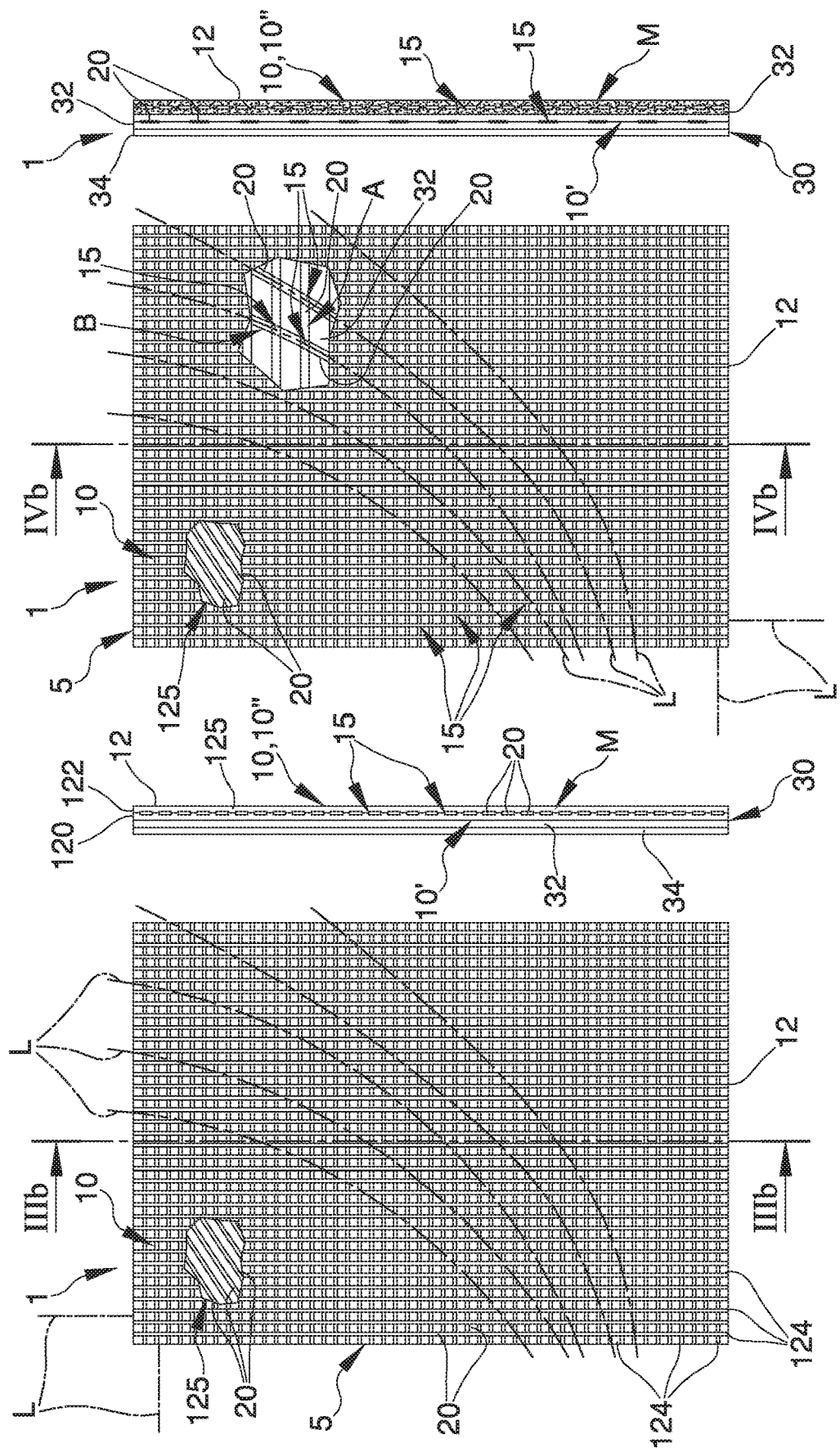

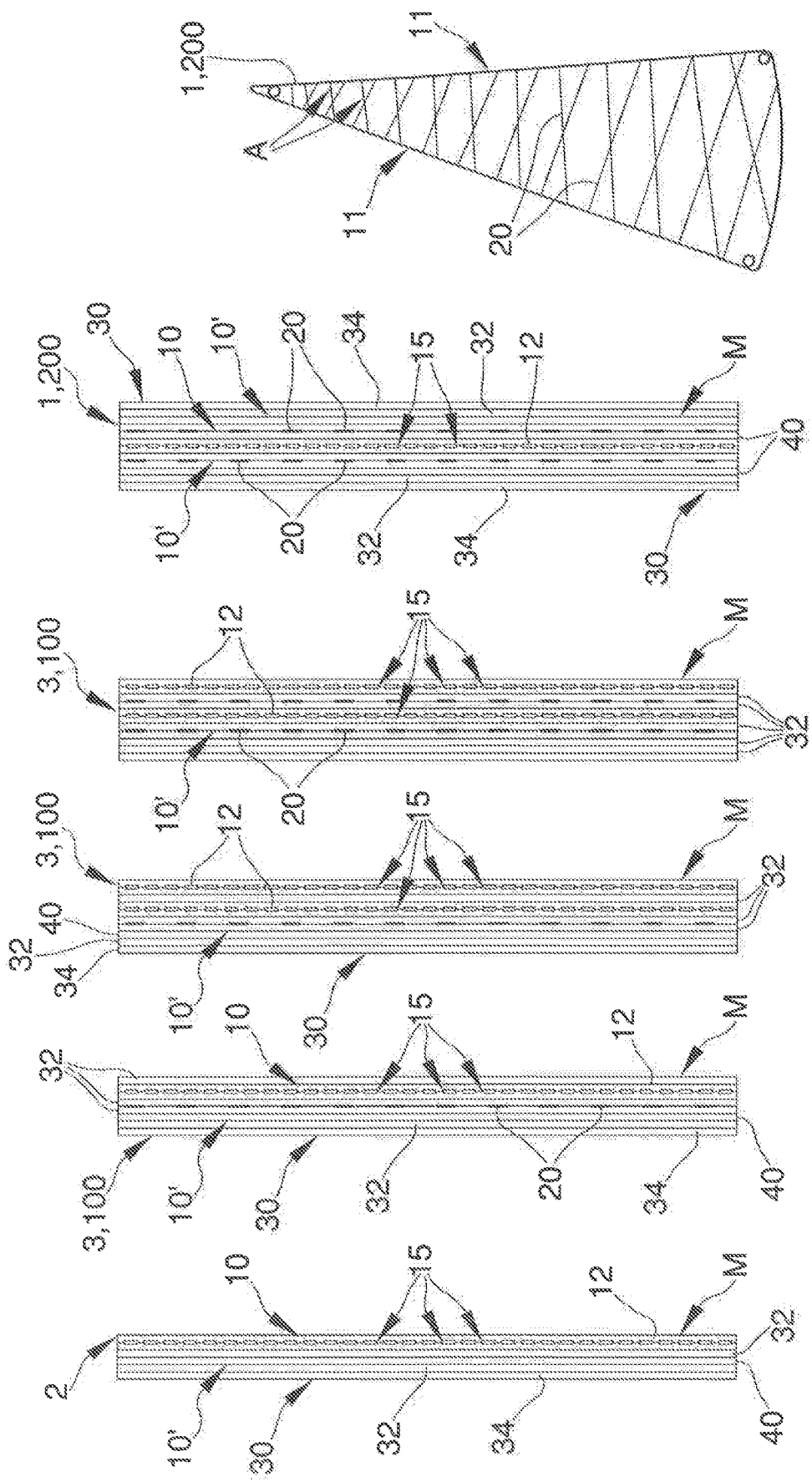

LAMINATE

CROSS REFERENCE TO RELATED APPLICATIONS

This application is a national phase of PCT application No. PCT/IB2014/063218, filed Jul. 18, 2014, which claims priority to IT patent application No. RA2013A000020, filed Jul. 19, 2013, all of which are incorporated herein by reference thereto.

The present invention relates to a laminate usable in the sector of constructions subjected to membrane type stresses. In particular, the present invention relates to a laminate usable in the sector of membrane type stresses in the field of civil and aeronautical construction engineering. In detail, the present invention relates to a method for constructing this laminate.

DESCRIPTION OF THE STATE OF THE ART

In the civil construction sector and in the aeronautical and naval construction sector, just as in the sail sector, the use of laminates has been known, shaped in various ways based on the function they require to perform and on the load model to which they are to be subjected when installed. Among these self-supporting shells are known, usable to withstand the action of internal pressure, and also shells subjected to aerodynamic loads, such as in the case of sails. In all these cases, the acting stress is of "membrane" type.

Numerous patents are known that describe laminates and construction methods. Among these the U.S. Pat. No. 5,097,784 by North Sails is particularly well known, teaching how to construct a sail by arranging uninterrupted filaments between two panels with adhesive applied to the opposed sides, so that these filaments are stably arranged according to given lines of force. Activation of the adhesive distributed on the inner faces of the panels and on the filaments allows the assembly of these components to bond, bearing in mind that the filaments are completely impregnated with adhesive. In time this causes a gradual loss of flexibility of these filaments, accentuated by exposure to sunlight, with the result that the filaments tend to break, irreparably compromising the product.

On the other hand, the patent EP1713687 and the patent application EP2162349/WO 2008/142725 contain teachings and indications that represent a valid support to the above. In particular, in these patent documents references are found to laminate membrane bodies reinforced with cables contained inside sheaths arranged according to lines of force traced based on the necessary requirements. The sheaths and the cables are obtained from a same bundle of uninterrupted filaments following cohesion of the threads of the outermost layer of the bundle, obtained through thermal activation of an adhesive with which this outer layer was previously permeated.

Here and hereinafter, membrane body is intended as a body in which the related extensions measured along directrixes substantially orthogonal to each other both prevail on the thickness of at least one degree of magnitude.

Covers, and in particular sails, constructed in this manner are particularly flexible under no load, contrary to those in which the carbon is totally impregnated with the adhesive that bonds the protective outer skins; therefore, these products are particularly robust when installed and can be folded easily without damage, with the advantage that the original mechanical characteristics are maintained. A significant detail of application of the teachings of these patents by the applicant is the substantial reduction of the costs and of the mass of sails, the most appreciable effect of which is the reduction of heeling load acting on the sailing boat during use, thereby facilitating maneuvering of the vessel and increasing ease of use with the same acting aerodynamic load.

The patent DE 200 11 626 also describes a method for the manufacture of a sail, according to which this sail is obtained by stitching together panels of suitable shape and size according to the position allocated in the sail, so as to obtain portions of sail that are then in turn stitched together to form the final product. According to the method described, panels comprising "reinforcing fibres" are used, and the panels are cut and stitched together so that the fibres of each single panel are substantially parallel to a respective axis of symmetry. In this way, it is claimed that the forces acting globally on the Sail are continuously discharged onto the fibres from one end to the other of the sail, limiting the number of reinforcing fibres that are interrupted. It must be noted that the teachings of patent DE 200 11 626 make no precise references to the method of connecting the reinforcing fibres to the respective panel.

On the other hand, the requests of the designers of particularly imaginative civil covers and of sail plans for the most recent sailing vessels aim at obtaining laminates presenting combinations of characteristics, which are not currently found together: increased lightness, extreme flexibility under no load and as much rigidity possible after installation, together with dimensional stability and stability of its characteristics over time. In particular, taking the sail sector as an example, the designers of sailing vessels are increasingly requesting thinner and more flexible sails that can be easily folded away in small stowage spaces, without the "shape memory" effect that retains the stowage shape, light to hoist and therefore easy to transport, but very rigid when installed to provide a lift close to that of a rigid wing and minimum contribution to the overturning moment in the event of heeling during sailing. Finally, a characteristic that is considered increasingly essential is the cost of the product and of related maintenance. Naturally, in view of the fact that the nature of the base product used to produce a sail is identical to that of products usable to construct covers for construction engineering, it would be desirable also to provide covers with these characteristics.

In view of the above description, the problem of producing laminates for the construction of sails or covers for civil engineering presenting the aforesaid characteristics or a combination thereof, both at rest and when installed (even if some of these may at first sight seem antithetical due to the experience obtained to date) currently remains unsolved and, precisely in view of the above, represents an interesting challenge for the applicants, whose object is to market laminates increasingly in line with clients' needs.

SUMMARY OF THE PRESENT INVENTION

The present invention relates to a laminate usable in the sector of constructions subjected to membrane type stresses. In particular, the present invention relates to a laminate usable in the sector of membrane type stresses in the field of civil and aeronautical construction engineering. In detail, the present invention relates to a method for constructing this laminate.

An object of the present invention is to produce a laminate with high mechanical strength, high resistance to aging, high dimensional stability, stability under load of the position of the longitudinal reinforcing members, durability and consistency of the mechanical and shape characteristics, which has none of the drawbacks illustrated above and satisfies a plurality of requirements that to date have not been met, to represent a new and original source of economic interest capable of modifying the current market of static covers and of aerodynamic appendages.

According to the present invention there is produced a laminate for the construction engineering sector whose main characteristics will be described in at least one of the claims below.

A further object of the present invention is to produce a sail comprising the laminate as above.

According to the present invention there is produced a sail whose main characteristics will be described in at least one of the claims below.

Another object of the present invention is to provide a method for constructing said laminate.

According to the present invention there is provided a method for constructing said laminate.

BRIEF DESCRIPTION OF THE FIGURES

Further characteristics and advantages of the laminate according to the present invention, and of the related construction method, will be more apparent from the following description, set forth with reference to the accompany figures, which illustrate some non-limiting examples of embodiment, in which identical or corresponding parts of the device are identified by the same reference numbers. In particular:

FIG. 1 is a plan view of a laminate according to the present invention;

FIG. 2 comprises a plan view and a cross sectional view of a detail extracted from FIG. 1;

FIG. 3 comprises a plan view and a cross sectional view of a second preferred embodiment of FIG. 2;

FIG. 4 is a cross sectional view of a third preferred embodiment of FIG. 2;

FIG. 5 are cross sectional views of a fourth preferred embodiment of FIG. 2;

FIG. 6 is a cross sectional view of a fifth preferred embodiment of FIG. 2;

FIG. 7 is a cross sectional view of a sixth preferred embodiment of FIG. 2; and

FIG. 8 is a plan view of a variant of FIG. 1.

DETAILED DESCRIPTION OF THE PRESENT INVENTION

In FIG. 1 a laminate according to the present invention is indicated with the reference number 1. Considering that the size that a laminate 1 can assume in practice can be decidedly larger, above all in the case in which a laminate 1 is constructed to be used as cover of a large open space, the laminate 1 has been shaped in the FIG. 1 for practicality and, without loss of generality, similarly to a sail 200, which is known to be a membrane type body usable in the aerodynamic profile construction sector. The construction details of the laminate 1 are illustrated in FIGS. 2-7 with reference to a respective central portion 5 of the laminate 1 visible in FIG. 1, wherein this portion 5 is delimited by a substantially rectangular shaped perimeter. For clarity it is useful to specify that this central portion 5 is structured in entirely the same way as a rectangular portion extracted from any other part of the laminate 1, so that this choice is motivated purely by drawing requirements and does not limit the generality of the present description.

In FIG. 2 it can be noted that the laminate 1 is provided with a membrane type reinforcing structure 10 that embodies a plurality of traction members arranged according to preferred lines L of force to allow the laminate 1 to react effectively to membrane type stresses. These traction members are produced through elongated bodies 20 that can comprise, selectively or in combination, for example but in any case, without limitation, yarns or strips or reduced thickness, or filaments organized in a net 12, such as in FIGS. 2-4, or structured similarly.

With particular reference to FIG. 2b, the laminate 1 comprises at least one protective skin 30 that delimits the reinforcing structure 10 in correspondence of a respective face 10' and is provided with a first heat-sealing inner film 32 to which the elongated bodies 20 are applied and with a second protective film 34 arranged on the opposite side to the elongated bodies 20 relative to the first film 32. The first and the second films 32 and 34 are bonded to each other point to point in a matching manner (therefore stably/rigidly) so as to give the skin 30 a substantially laminar shape. The first and second film 32 and 34 are made of plastic materials selected so that the first film 32 can melt at a lower temperature than the second film 34. Therefore, it is easy to understand that the matching connection between the skin 30 and the reinforcing structure (comprising the elongated bodies 20 applied singularly or organized in net 12) takes place through application of a thermal cycle that heats the skin 30 to a temperature greater than the melt temperature of the first film 32 and below the melt temperature of the second film 34. During application of this thermal cycle, when the temperature is approximately at the maximum value, sufficient pressure will be applied to compact all the components of the laminate 1 (at a pressure value sufficient to cause compaction but defined so as not to alter the mechanical characteristics and the thickness of the elongated bodies 20) until the assembly cools to ambient temperature on a surface transverse to that of the skin 30, of the elongated bodies 20/of the net 12, in a manner that is known and therefore not illustrated.

The succession of steps described above determines, in succession, melting of the first low melt film 32, diffusion of the molten material between the elongated bodies 20, adhesion of the components wetted when hot by this material to the film 34 of the skin 30. Cooling of the assembly is followed by the material forming the first film determining bonding in a matching manner between the reinforcing structure 10, (in any case constituted according to the description above) and the second film 34. In this way, the second film 34 can exercise a protective function also during the heating process of the first film in which the mechanical and morphological characteristics of the second film 34 remain totally unchanged. Moreover, when the material forming the first film 32 cools, the elongated bodies 20 and/or the mesh of the net 12 that have been wetted by the liquefied material will remain embodied in a single matrix M that, from a three-dimensional viewpoint, has the impression of the profile given by the distribution allocated to the elongated bodies 20, however organized (free or in a net 12). Therefore, each reinforcing structure 10 thus produced represents a reinforcement stabilized by the elongated bodies 20 (however organized) which will be retained/constrained structurally to one another in positions given by the matrix M formed by melting of the first film 32. It is easily understood that a laminate 1 produced in this manner, in which the elongated bodies 20 are embodied by the molten material of the first film 32 and are therefore constrained in an adhesive manner and in shape on the respective faces and on the respective flanks, combines characteristics of lightness and robustness of the skin 30 and of the reinforcing structure 10 in a unique manner and therefore it can be used, alone or covered on the side of the elongated bodies 20 by another high melt film, for the construction of canvases for shading or headsails for very light winds.

The fact that the heat-sealable material is already part of the skin 30 and is distributed uniformly on the second film 34 makes it possible to simplify the production process of the laminate 1 compared to the prior art.

At this point, it is also useful to specify that the adhesion capacities of a heat-sealable material occur in a different manner based on the processing temperature, in the sense that downstream of "setting" a heat-sealable material can be separated from the material to which it was applied simply by increasing the temperature to values close to those of its melt temperature. This peculiarity facilitates the execution of maintenance operations to replace damaged components or to restore the laminate 1.

In view of the description above, each pair of plastic materials presenting the specifications indicated above are suitable to form part of the skin 30. For example, in the case in which the skin 30 and the reinforcing structure 10 were made using hydrocarbons from the polyolefin family, the degree of mutual adhesion would be maximized. In particular, by bonding a first film 32 and a second film 34 both made of polymers from the polyethylene vinyl acetate family, also know with the acronym EVA, it is possible to associate its own distinct melting temperature with the layer formed by each film. In this case, both compounds would comprise polyolefin fibres with a high elastic modulus, comprised at least between 60 and 180 GPa. To obtain this result, i.e. the first and the second film 32 and 34 made with similar polymers with different melt temperatures, it is possible to act in a known manner on the different level of crystallinity of the EVA or on the ratio between the dosage of ethyl and of vinyl contained therein; a greater level of crystallinity of the EVA will correspond to a higher melt temperature, and to a higher percentage of ethylene. In this case, the skin 30 will present a high melt face between 120° C. and 125° C. (the second film 34) and a low melt face at 95° C. (the first film 32). In view of continuous developments in thermoplastic fibres, it is considered possible to use materials with an elastic modulus even greater than 180 GPa to construct even more rigid reinforcing structures 10 without however limiting the protective scope of the present invention.

Moreover, it should be noted that the density of these compounds is comprised between 0.95 and 1 g/cm3, therefore it is accepted that it is lower than the density of water. This is particularly useful in the case in which the laminate 1 is used for marine applications, such as to make sails. The current trend in the development of these compounds is to increase the elastic modulus to over 200 GPa, although with an increase in density to above the value of 1 g/cm3. Therefore, it is possible to use elongated bodies 20 with a density of 1.1 g/cm3 to provide the laminate with particularly high rigidity with the same structural shape.

In view of the description above, the choice of polymers of the polyethylene vinyl acetate family to make the laminate 1 makes it possible to produce a reinforcing structure 10 in which the elongated bodies 20 are stably reinforced in a matching manner through the first film 32 in given positions and in which the elongated bodies 20 are protected from the weather and from ultraviolet rays through the second film 34. The elongated bodies 20 can also be made with polymers derived from polyethylene, thus presenting high chemical affinity with the EVA of the skin 30 and each net 12, facilitating structurally reciprocal and permanent bonding after application of the combination of the thermal cycle described above and sufficient pressure. In this case, between elongated bodies 20 in contact (direct or through the medium of the material of a first film 32 that may be interposed) phenomena of diffusion bonding take place, giving rise to the formation of joints that remain stable at the using temperature, and which are therefore mechanically comparable to knots, indicated with the reference number 15 in FIGS. 2-7.

In particular, to effectively implement the invention it was decided to use elongated bodies 20 also made of a polyolefin polymer with high modulus, with a substantially constant reduced thickness that falls within the range of 40-80 micrometers, with width comprised between 1 and 4 mm. The use of web shaped elongated bodies with the characteristics described above allows the construction of a substantially flat laminate 1, given that the variations in thickness in correspondence of the areas through which the webs pass are negligible relative to the average thickness of the laminate 1 and to its extension. The choice of materials forming the elongated bodies 20 (and the nets 12) homogeneous with those of each second film 34 allows maximizing of the degree of reciprocal bonding and the degree of hyperstaticity of the reinforcing structure that is mechanically comparable to a structure with fixed knots 15, which for practical reasons will be indicated with the reference number 10" (FIGS. 2-4).

If yarns are used to produce the elongated bodies 20, aramid fibres can be used, which, similarly to polyolefin fibres with high modulus, are not subject to embrittlement after bonding.

It should be specified that each net 12 can be provided with at least two layers 120, 122 of mutually parallel elongated bodies 20, as illustrated in FIGS. 2-4, superposed on or intersecting one another according to directions inclined with respect to each other in a manner defined according to the project specifications, and in particular at objective values of strength and rigidity of the laminate 1. These directions can be 90° as shown in FIGS. 2-4, but the net 12 can also be of the type with three axes, with a further layer 125 of elongated bodies 20 oriented to present three layers oriented along three different directions so as to maximize the rigidity of the reinforcing structure 10 (as illustrated in FIGS. 3a and 3b, and in a sectional view in FIG. 4a), in order to increase the degree the hyperstaticity under load of the laminate 1. On the other hand, in view of the description above, this addition leaves the flexibility of the laminate at rest substantially unchanged, given the reduced thickness of the elongated bodies 20, as will be better highlighted below.

It should be specified that if the reinforcing structure 10 comprises elongated bodies 20 between them, distributed according to lines of force defined at will or organized in nets 12, if necessary on layers 120, 124, 125 mutually superposed inside the respective matrix M produced by melting, then it is understood that the relative positions of the elongated bodies 20 are stable and therefore the connections between these bodies are rigid. This allows the reinforcing structure 10 to be made similar to a flexible structure with fixed knots 15. Each knot 15 comprises in this figure at least two elongated bodies 20 mutually perpendicular but can be further stabilized by the addition of a further layer 125 of elongated bodies 20 and by the consequent thickening of the matrix. Naturally, the rigidity of this structure will be definable at will in the design stage based on the precise "density" of the elongated bodies 20 in its extension.

In view of the description above, and with particular reference to FIGS. 2-4, the elongated bodies 20 can be bonded to the skin 30 along the lines L arranged, for example but without limitation, according to geometrical patterns distinct from one another A or B, to define stiffening portions indicated for practicality with the reference letters A' and B'. It should be highlighted that the elongated bodies 20 arranged according to the geometric pattern A are mutually parallel, while those arranged according to the geometric pattern B are arranged on curved lines with curvature definable at will, as can be seen in FIG. 4a.

It can be noted in FIG. 4 that the elongated bodies 20 of the stiffening portion A' have been arranged mutually parallel along a direction D determined for practicality and purely by way of example substantially horizontal in the plane of the sheet, and are distributed regularly spaced without however limiting the protective scope of the present invention.

The use of the laminate 1 described above is clear and requires no further explanations. However, it may be useful to specify that a laminate such as the one described herein can be used to act as an outer coating of products with a more complex structure to withstand membrane stresses of any magnitude. Moreover, it may be useful to specify that, based on the description above, each laminate 1 is produced by using pressure and adequate temperature to mutually bond a plurality of components arranged in layers, and in particular at least one coating skin, elongated bodies to provide mechanical strength along a given line, a net to provide mechanical strength along several directions, where these components are made using plastic materials that are very easy to source, such as polyolefins. In view of the fact that these materials have a very high elastic modulus, they can be produce in very limited thicknesses, present high chemical affinity, are inexpensive and can also be purchased in stocks of limited proportions, each laminate 1 has a limited complexity and can be easily made in systems of limited complexity in production facilities equipped with production means of minimum complexity and therefore with minimum economic expenditure.

Finally, it is apparent that variations can be made to the laminate 1 described above without however departing from the protective scope of the present invention. For practicality, here and hereunder the same numbers have been used for identical components that perform the same function, at least where this simplifies comprehension of the present description and of the subject matter of the present invention.

For example, it would be possible to mutually combine, in any order, single layers comprising EVA films, elongated bodies 20 made of high modulus polyolefin, preferably in the shape of a web, arranged mutually parallel or according to lines for propagation of the stresses acting on the laminate 1 when installed (according to the patterns A or B of FIG. 4a), nets 12, again made of high modulus polyolefin or of another material, provided that each net 12 and/or each stiffening portion A' or B' of elongated bodies 20 is arranged between two EVA films and the thermal cycle described above is applied in conditions of controlled pressure.

For example but without limitation, according to FIG. 5 the laminate 1 can be used to generate another laminate 2 comprising at least one membrane body 40 of reduced thickness, formed by a woven or nonwoven fabric, i.e. a product whose fibres are simply woven or pressed, which is arranged between the skin 30 and the reinforcing structure 10 in a matching manner. In view of the description above, each membrane body 40 is permeable to the molten material of the first film 32 when the respective melt temperature is exceeded, and therefore this molten material can pass through it. This allows the fibres of the membrane body 40 and the reinforcing structure 10 to be stably embodied. It can be easily understood that the function of this component is to stiffen the reinforcing structure 10 and, therefore, the laminate 1 in its entirety. The membrane body 40 can be made of a material heterogeneous with said matrix M, in particular of polyester and can, advantageously but without limitation, present a specific mass comprised between 5 and 60 g/m$^2$, so that against a consistent increase in rigidity, the specific mass of the laminate 1 is increased by a negligible amount even when the extension of the laminate 1 in its entirety is very large.

With reference to FIG. 6, the laminate 1 can be transformed into a more rigid laminate 3, but which is still flexible at rest, by applying on a face thereof opposite the skin 30 a reinforcing structure 10 composed of a plurality of portions A' or B' of elongated bodies 20 that may be arranged in a net 12, again mutually alternated by first films 32 made of EVA to produce a multi-layer body 100 to which the elongated bodies 20 provide rigidity distributed along the respective lines L, capable of reacting in a resisting manner on the directions identified by the elongated bodies 20 and therefore of being extremely rigid on each of these.

Otherwise, with reference to FIG. 7, two laminates 1 can be bonded against each other with the interposition of a first film 32 to produce a product whose outer faces are always formed by the second films 34 of the respective skins 30.

A product of this type is suitable to operate in a configuration alternatively concave or convex relative to a transverse plane of reference. Therefore, in view of the symmetry of the structure and of the hyperstaticity provided by the arrangement of the components of which it is formed, this product is particularly suitable for making a cover or a sail 200 such as the one in FIG. 1, once proportioned and dimensioned based according to the design limitations. It is easily understood that the superposing order and the number of the layers of nets 12 and/or of the portions A or B of elongated bodies 20 will depend on the project specifications of the cover or of the sail 200.

It can be noted that, due to the particularly limited thickness of the webs with which the elongated bodies 20 can be made, the thickness and the respective mass of the final product, whether a multi-layer body 100 or a sail 200, will be greatly reduced, with enormous advantages for uses on sporting vessels, due to the decrease in the heeling contribution given by the aerodynamic appendages.

With particular reference to FIG. 8, each laminate 1 can present the elongated bodies 20 of the respective first portion A' arranged transverse to an outer edge 11 of the laminate 1, which in the sail 200 will be made to coincide with an input or output edge thereof. In this way, the superposed laminates 1 will present the elongated bodies 20 of the respective first portions A' mutually inclined by an acute angle that can be comprised between 5° and 30°. This will allow a further increase in the rigidity of the loaded sail 200, through the increase in the hyperstaticity of the respective structure. In this way each sail 200 will be more rigid and robust without losing flexibility, limiting the increase of its mass.

In relation to the aspect of the rigidity of the laminate 1 under load, and also of the multi-layer body 100 or of the sail 200, it is useful to point out that this mechanical characteristic is closely linked to the quantity and to the distribution of the web-shaped elongated bodies 20, and to the respective possibility of being welded point to point giving a noteworthy increase of the membrane rigidity of the adjacent layers, whether these are made of nets 12 or of other elongated bodies 20, in direct contact or alternated with first films 32. The greater the density of the knots 15 described above is, the greater the rigidity when installed of the matrix M in which they are embodied and, consequently, of the related laminate 1/multi-layer body 100/sail 200, will be.

The increase in rigidity occurs in the laminate 1/multi-layer body 100 or in the sail 200 at distances in the order of 2-4 times the width of the respective cross section of the elongated bodies 20 from the respective outer edge. This means that using elongated bodies 20 of a width comprised between 2 and 3 mm arranged on several layers at a distance comprised between 8 and 15 mm, in each of which the elongated bodies 20 can be oriented in a different manner, makes the corresponding laminate 1/multi-layer body 100/sail 200 a very hyperstatic membrane body, distinguished by a very marked combination of dimensional rigidity and structural/mechanical stability under load. It is apparent that this evidence makes each laminate 1/multi-layer body 100/sail 200 thus manufactured particularly suitable to be used in the presence of fluid in movement, where maintaining the shape is a crucial requirement for maintaining over time a given lift value.

Moreover, it should be specified that the condition of point to point welding determined between each elongated body 20 and/or the layers 120, 122, 125, however superposed on one another in the matrix M, provides the reinforcing structure 10 with a capacity to withstand acting loads that is distributed uniformly throughout the extension thereof and increases in proportion to the increase in specific density of the knots 15 described above in the reinforcing structure 10. The main consequence of this situation is that under load the deformation of each laminate 1/multi-layer body 100 or sail 200 embodying this reinforcing structure 10 is uniform and free from local distortions of the outer surface. The lack of these distortions on this surface makes it possible to justify the assertion that each laminate 1 embodying a reinforcing structure 10 as described above is particularly suitable for constructing aerodynamic profiles or particularly efficient sails 200.

Based on the description above, it should be added that the production method of each laminate 1, in the form illustrated in FIG. 1 or in the form described with reference to the multi-layer body of FIGS. 6a-6c or to the sail 200 of FIGS. 1 and 8, must comprise the steps of alternately arranging a bonding layer, comprising at least a first film 32, and a layer of components of the reinforcing structure 10 comprising a plurality of elongated bodies 20 distributed at will. The step of depositing any layer of components described above of the reinforcing structure 10 can be preceded or followed by a stiffening step, comprising depositing at least one membrane body 40. The production method is completed with the step of applying the thermal cycle and pressure for times sufficient to allow diffusion of the EVA inside the reinforcing structure 10 will allow the construction of the plastic matrix M made very hyperstatic by the presence of the nets 12 and by the elongated bodies 20, and if necessary by the membrane bodies 40.

It is apparent that application of the heat required to raise the temperature of the semi-finished product produced as described above by superposing layers to the level of the melt temperature of the first films 32 can be carried out in a purpose-built oven or inside a hot rolling mill, capable of exerting on the semi-finished product the calibrated pressure and the temperature suitable to allow production of the matrix M for the time required to complete diffusion of the EVA according to the design specifications of the matrix M and to stably associate them in said matrix M.

In view of the above description, it should be specified that the mechanical properties of the laminate 1/multi-layer body 100 and of the sail 200 are entrusted to the high mechanical strength that characterizes the polyolefin fibres with high modulus used to construct the structural components of these products, and to the geometrical arrangement that will be allocated to the elongated bodies 20 in the layers comprising them. This characteristic, of primary importance for obvious reasons of reliability and safety, is accompanied by the high resistance to aging of these materials, ability to maintain and retain their properties over time, and by dimensional stability both in using conditions of the product and during manufacture. Other properties of particular interest for the specific use of this type of reinforcement are a density lower than that of water and hydrophobicity. This last characteristic is linked to its chemical nature and results in reduced surface energy, common to all members of the polyolefin family. This makes this class of polymers very useful as adhesives but makes bonding very difficult. This drawback can be solved by using assembly aids belonging to the same family of polymers, if necessary used as already illustrated in the prior art documents mentioned previously. On the other hand, this drawback can be solved by substituting the second film 34 with material compatible with the EVA of the first film 32 but melting at a higher temperature than the EVA, while maintaining optimal lamination stability. One of these materials could be polyurethane, also with a very limited cost and with decidedly more protection than EVA as it melts at around 165° C., equipped with high crystalline stability also following lengthy exposure to the sunlight. Moreover, the use of polyurethane to produce protective skins for products such as the laminate 1/multi-layer body 100, the sail 200 is particularly suitable due to the peculiarity that it can be easily printed or painted or due to the increased chemical reactivity to the adhesive materials, so that stable application of adhesive films does not require the use of stitches to stabilize the connection. These peculiarities are decidedly more marked when the polyurethane used has an aliphatic base. For clarity, the production of skins formed by two matching layers of EVA and polyurethane is possible through the melt extrusion procedure, in which, as is known, the films of the two materials are already created mutually superposed, with considerable practical and economical advantages.

To conclude, the manufacturing technology of the laminate 1 described above, based on the combined action of temperature and pressure appropriately modulated in time, applied to a semi-finished product of different structural complexity, adds to the structural stability of the various materials used at the process and using temperatures. Moreover, the combined action of temperature and pressure allows geometric compaction of the components of the laminate 1 without any variation under load of the trajectories allocated to the elongated bodies 20 according to the project specifications and determines optimal levels of adhesion, thanks to the formation of stable interfaces between all the components of the composite material produced. In particular, this depends on the low surface energy of the thermoplastic adhesives used, which are liquid at process temperatures and capable of rapidly wetting all the components to block them in the predetermined positions after cooling, ensuring that they perform the allocated functions after the material has been returned to ambient temperature for respective transport and use. The adhesive action is promoted by the decrease in surface energy determined by the increase in temperature during processing and by the occurrence of diffusion bonding phenomena activated through application of the thermal cycle described above and promoted by the chemical affinity between the thermoplastic materials used and those used to construct the reinforcing structures; the chemical affinity contributes to making permanent, in use, the connection of the elongated bodies 20 (applied singularly or organized in net 12) mutually superposed in the knots 15 and increases the degree of hyperstaticity of the reinforcing structure 10 effectively making it (namely the latter) with fixed knots 15.

The invention claimed is:

1. A sail having at least two flexible plastic laminates, each flexible plastic laminate is delimited by a protective skin and provided with reinforcing means, said reinforcing means comprising a plurality of traction members formed as plastic strips having a thickness in a range of 40-80 micrometers and a width in a range of 1-4 mm, arranged according to lines of force and stably connected to said protective skin, wherein said protective skin comprises a first film and a second protective film bonded to said first film in a matching manner on opposite side of said plurality of traction members, before application of a thermal cycle, said first and said second films made of thermoplastic materials, said reinforcing means fixedly embedded in said first film and wherein the two flexible plastic laminates presenting on outer sides of said protective skins, are connected to each other in a matching manner through interposition of a further film substantially identical to said first film.

2. The sail according to claim 1, characterised in that said at least two flexible laminates present the plurality of traction members inclined with respect to each other by an acute angle comprised between 5° and 30°.

* * * * *